April 18, 1939.   H. T. ANDERSON   2,155,111
CREAM SEPARATOR
Filed April 3, 1937
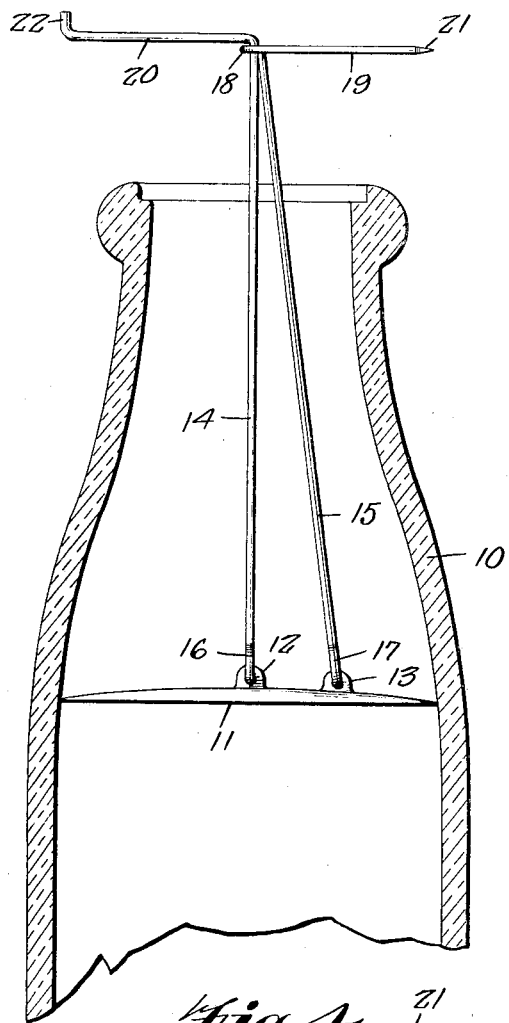
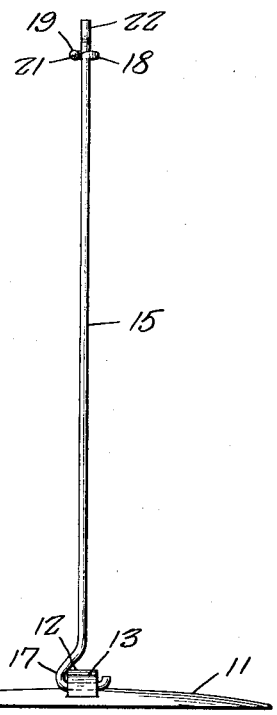
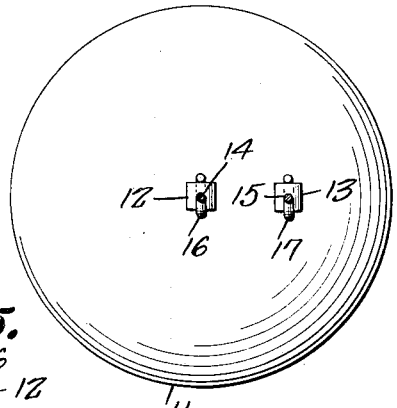
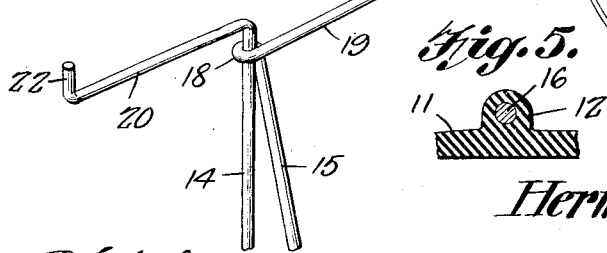
Herman T. Anderson,
INVENTOR
BY Victor J. Evans & Co.
ATTORNEYS Patented Apr. 18, 1939

2,155,111

UNITED STATES PATENT OFFICE 2,155,111

CREAM SEPARATOR

Herman T. Anderson, Le Feria, Tex.

Application April 3, 1937, Serial No. 134,849

1 Claim. (Cl. 210—51.5)

This invention relates to cream separators and has for an object to provide a cream separator including a stopper and levers connected to the stopper by means of which the latter may be tilted and lowered into or withdrawn from a milk bottle.

A further object is to provide a cream separator having a flexible tapered rubber stopper to continuously conform to the size of the bottle neck when removing the cream.

A further object is to provide a cream separator of this type having levers and a stopper the levers being provided at their upper ends with handles which extend in opposite directions from the levers, the combined length of the handles being greater than the diameter of the neck of the bottle so that the handles will prevent the device from falling completely into the milk bottle.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a sectional view of a milk bottle showing a cream separator constructed in accordance with the invention in applied position to remove cream from the top of the bottle.

Figure 2 is a side elevation of the cream separator shown in Figure 1.

Figure 3 is a plan view of the stopper showing the levers in section.

Figure 4 is a detail perspective view showing the handles projecting in opposite directions from the upper ends of the levers.

Figure 5 is a detail cross sectional view showing one of the hinge ears of the stopper and the hook of one of the levers therein.

Referring now to the drawing in which like characters of reference designate similar parts in the various views, 10 designates a conventional milk bottle. As is well known, the cream rises to the top and the milk settles to the bottom. For removing the cream a disc stopper 11 of substantially the same diameter as the diameter of the milk bottle below the shoulders of the bottle is provided, the stopper preferably being formed of rubber and being tapered toward the edges so as to be flexible at the marginal edge.

The rubber stopper is provided with spaced hinge ears 12 and 13, the former being located at the center of the top of the stopper and the latter being located midway between the center and the peripheral edge of the stopper as best shown in Figure 3.

A pair of levers 14 and 15 are provided with hooks 16 and 17 respectively which are hooked through the hinge ears 12 and 13 of the stopper. These levers are of sufficient length to extend above the bottle when the stopper is lowered to the bottom of the cream in the bottle. As best shown in Figure 4, the upper end of the lever 15 is provided with an eye 18 which slidably receives the upper end of the lever 14 and from this eye a handle 19 projects at substantially a right angle to the lever 14. The lever 14 above the eye 18 is also provided with a handle 20 which extends at a right angle to the lever and also extends oppositely to the handle 19. The combined length of both handles 19 and 20 is greater than the diameter of the mouth of the milk bottle so that the handles will prevent the device from falling completely into the milk bottle.

The handle 19 is provided with a sharpened point 21 to penetrate the paper stopper of a milk bottle, and the handle 20 is provided with an upturned end 22, for effectively removing the paper stopper of the milk bottle.

In operation the lever 14 may be raised relatively to the lever 15 to dispose the stopper 11 vertical. Thereupon the device may be lowered into the milk bottle until the stopper arrives at the bottom of the cream. The lever 14 may be then lowered to dispose the stopper horizontally as shown in Figure 1. The device may then be lifted from the bottle, the flexible edges of the stopper yielding to conform snugly to the neck of the bottle during withdrawal of the device for separating the cream from the milk. After the cream has been separated the device may be slidably lowered into the bottle and the lever 14 again lifted to dispose the stopper 11 in a vertical position to facilitate easy withdrawal from the neck of the bottle.

From the above description it is thought that the construction and operation of the invention will be fully understood without further explanation.

What is claimed is:

A cream separator comprising a circular pliable rubber disc tapered toward the edge and having a center hinge eye and eccentric hinge eye on the top face, a pair of levers formed of stiff wire hinged at the lower ends to respective ones of said eyes, the lever connected to the eccentric eye sloping toward the lever connected to the center eye and being formed at the upper end with a convolution receiving the last named lever, both levers being bent outwardly at a right angle at the upper end to provide oppositely extending handles, the combined length of said handles being greater than the diameter of the neck of a milk bottle and being adapted to engage said neck and prevent the cream separator from falling into the bottle, one of the handles terminating in a sharpened point and the other terminating in a hook, the hook and eye being adapted to effect removal of a paper milk bottle stopper preparatory to removing the cream.

HERMAN T. ANDERSON.